(12) United States Patent
Hasegawa

(10) Patent No.: US 9,073,583 B2
(45) Date of Patent: Jul. 7, 2015

(54) RECTIFIER OF VEHICLE WHEEL HOUSE

(71) Applicant: Fuji Jukogyo Kabushiki Kaisha, Tokyo (JP)

(72) Inventor: Takumi Hasegawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/109,522

(22) Filed: Dec. 17, 2013

(65) Prior Publication Data

US 2014/0175830 A1   Jun. 26, 2014

(30) Foreign Application Priority Data

Dec. 25, 2012 (JP) .................. 2012-281354

(51) Int. Cl.
  *B62D 35/00* (2006.01)
  *B62D 25/16* (2006.01)
(52) U.S. Cl.
  CPC ................ *B62D 35/00* (2013.01); *B62D 25/16* (2013.01)
(58) Field of Classification Search
  CPC ....................................................... B62D 35/02
  USPC ........................................... 296/180.1, 180.2
  See application file for complete search history.

(56) References Cited

U.S. PATENT DOCUMENTS

| | | | | |
|---|---|---|---|---|
| 5,511,847 A | * | 4/1996 | Weisbarth et al. | 296/180.1 |
| 5,626,185 A | * | 5/1997 | Gielda et al. | 165/41 |
| 7,380,869 B2 | * | 6/2008 | Nakaya | 296/180.1 |
| 8,210,600 B1 | * | 7/2012 | Verhee et al. | 296/180.1 |
| 8,523,270 B2 | * | 9/2013 | Marlier et al. | 296/180.1 |
| 2007/0182207 A1 | * | 8/2007 | Nakaya | 296/180.1 |
| 2010/0156142 A1 | * | 6/2010 | Sumitani et al. | 296/180.1 |
| 2011/0001334 A1 | * | 1/2011 | Hirano | 296/180.1 |
| 2012/0091753 A1 | * | 4/2012 | Marlier et al. | 296/180.1 |
| 2012/0169085 A1 | * | 7/2012 | Verhee et al. | 296/180.1 |

FOREIGN PATENT DOCUMENTS

| | | | |
|---|---|---|---|
| JP | 02303980 A | * | 12/1990 |
| JP | H60227436 | | 8/1994 |

* cited by examiner

*Primary Examiner* — H Gutman
(74) *Attorney, Agent, or Firm* — Smith, Gambrell & Russell, LLP

(57) ABSTRACT

A rectifier of a vehicle wheel house to rectify an air flow in the wheel house housing a wheel includes: an air passage configured to introduce running wind from a forward position of a vehicle; and an air blowing port which is formed at a partition wall member included in a partition wall of the wheel house on the vehicle body side, and configured to allow the running wind through the air passage to strike an outer circumferential surface of the wheel.

11 Claims, 6 Drawing Sheets

RECTIFIER OF VEHICLE WHEEL HOUSE

CROSS-REFERENCE TO RELATED APPLICATIONS

The present application claims priority from Japanese Patent Application No. 2012-281354 filed on Dec. 25, 2012, the entire contents of which are hereby incorporated by reference.

BACKGROUND OF THE INVENTION

1. Technical Field

The present invention relates to rectifiers of a vehicle wheel house that is configured to rectify the flow of air in the wheel house housing a wheel.

2. Related Art

In a vehicle such as an automobile, when running wind flows into a wheel house housing a wheel, turbulence is generated in the flow which issues to the outside from the space between an arch and the wheel, and thus the air resistance of the vehicle may be increased.

Thus, for example, Japanese Unexamined Patent Application Publication (JP-A) No. H6-227436 proposes a technique to improve overall vehicle aerodynamic characteristics related to air resistance and lift characteristics by ventilating air from the inside of a wheel house to the outside through an air passage, via which a first opening and a second opening are communicated with each other, the first opening being provided in the wheel house and configured to introduce air, the second opening being provided in the lower surface of the vehicle and configured to discharge air.

However, the technique disclosed in JP-A No. H6-227436 makes the air in the wheel house escape so as to rectify the air flow. Smooth escape of the air flow in the wheel house indicates that running wind is likely to flow into the wheel house physically. For this reason, conversely, an increase in the quantity of the air flow in the wheel house may occur, which is a factor of turbulence.

As illustrated in FIG. 6, in a conventional vehicle 1', when an air flow Fu flowing from a road surface G under the front of the vehicle increases in a wheel house 3' housing a wheel 2', this dominant flow results in a fundamental factor of turbulence. Thus, turbulence is generated in the air flow which issues from the wheel house 3' to the outside. Consequently, the air resistance of the entire vehicle increases and it is difficult to improve the aerodynamic characteristics of the vehicle.

SUMMARY OF THE INVENTION

The present invention has been devised in view of the above-described situation, and it is an object of the invention to provide a rectifier of a vehicle wheel house that is capable of reducing a turbulence-causing flow of running wind into the wheel house and reducing turbulence of the flow which issues from the wheel house to the outside.

An aspect of the present invention provides a rectifier of a vehicle wheel house that rectifies an air flow in the wheel house housing a wheel. The rectifier includes: an air passage to introduce running wind from a forward position of a vehicle; and an air blowing port which is formed at a partition wall member included in a partition wall of the wheel house on a vehicle body side, and configured to allow the running wind through the air passage to strike an outer circumferential surface of the wheel.

DETAILED DESCRIPTION

Figure 1A:
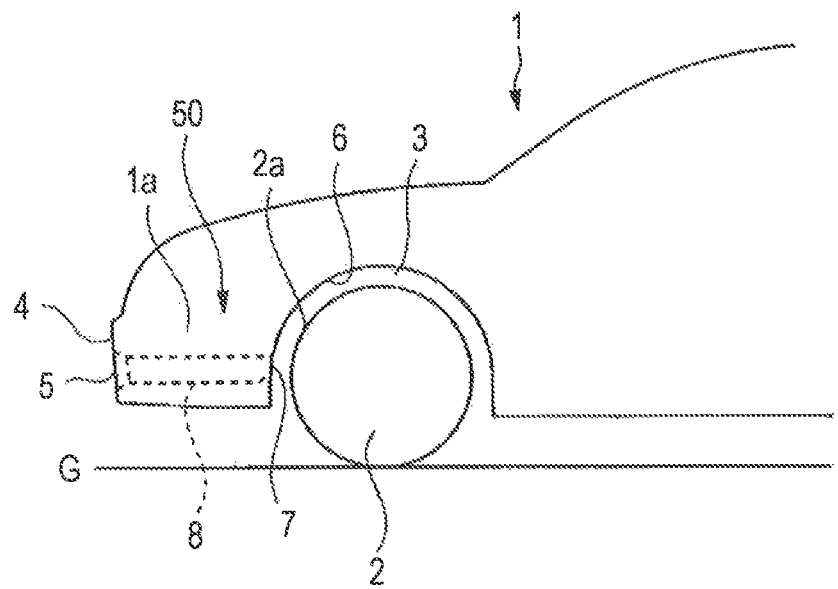
FIGS. 1A and 1B are each an explanatory view of the front of a vehicle illustrating a rectifier of a wheel house.
Figure 1B:
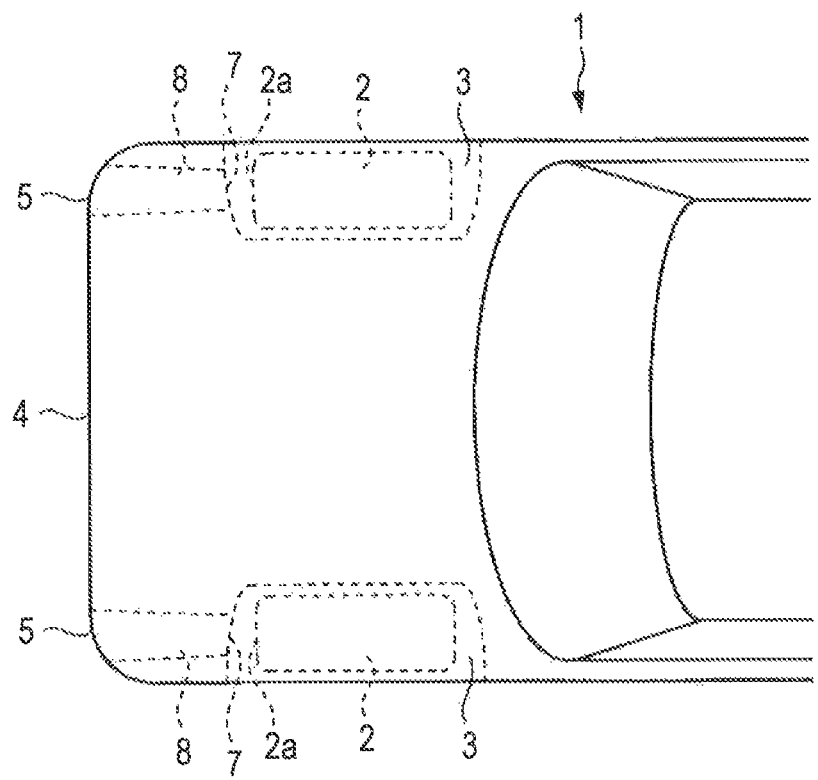

Hereinafter, an example of the present invention will be described with reference to the drawings. In FIGS. 1A and 1B, a reference numeral 1 indicates a vehicle such as an automobile to which the example of the present invention is applied. The vehicle 1 is provided with rectifiers 50 to rectify an air flow for respective arched wheel houses 3 housing wheels 2. As illustrated in the plan view of FIG. 1B, the rectifiers 50 are provided to the respective wheel houses 3 on the right and left of the vehicle 1. Because the vehicle 1 has the same structure on the right and left, the side view illustrated in FIG. 1A will be mainly described below.

Each of the rectifiers 50 mainly includes: an air introduction port 5 which is open below a lateral side of a bumper 4 that is an exterior member of the front of the vehicle; an air blowing port 7 which is formed at a mud guard 6 so as to face an outer circumferential surface 2a (tire tread surface) of the wheel 2; and an air passage 8 through which the air introduction port 5 and the air blowing port 7 are communicated with each other. The mud guard 6 is a partition wall member included in the partition wall of the wheel house 3 near the vehicle body, The air passage 8 is a duct-like passage disposed in the front of the vehicle. Air blowing through the air blowing port 7 strikes the outer circumferential surface 2a of the wheel 2.

In this example, the air blowing port 7 is formed as an aperture having an opening area smaller than the passage cross-sectional area of the air passage 8, whereby the air blowing port 7 allows an air flow to issue at a higher speed. The air blowing port 7 is open at a predetermined position in a direction from the lower end position of the bumper 4 toward an upper portion of the wheel 2. In this example, the air blowing port 7 is open toward a position slightly above the center of the front side of the wheel 2, and it is so designed that the air flow strikes the outer circumferential surface 2a of the wheel 2 at the front side as illustrated in FIG. 1B.

The air introduction port 5 may be formed by using an existing grille, or the air introduction port 5 may be provided in an engine compartment 1a.

Figure 2A:
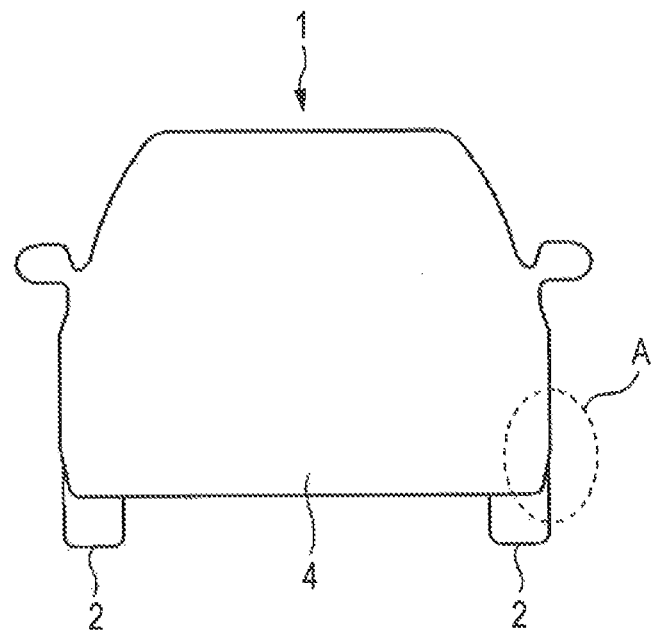
FIGS. 2A and 2B are each a front view illustrating the shape of the sides of a bumper of the front of the vehicle.
Figure 2B:
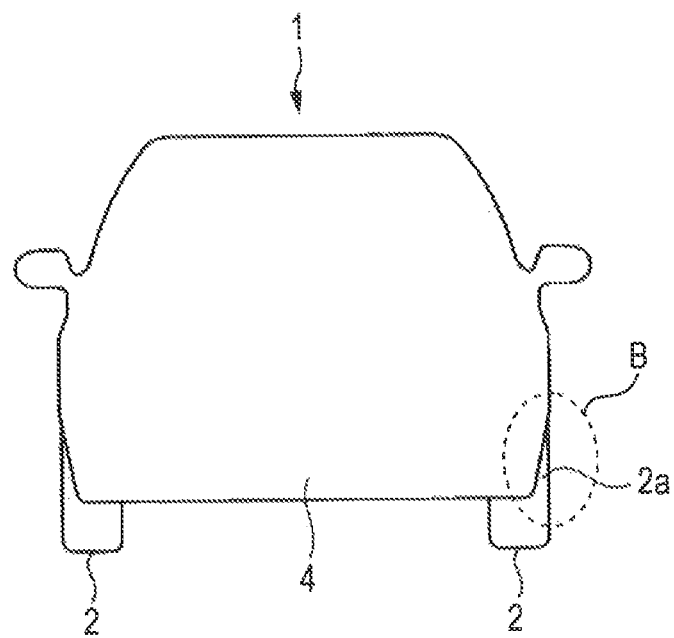

In this case, the bumper 4 at the front of the vehicle may have a normal shape as illustrated in FIG. 2A. when viewed from a forward position of the vehicle. However, as illustrated in FIG. 2B, it is preferable that the shape of the right and left sides of the lower end of the bumper 4 has a tapered down shape which has narrower width as the shape is closer to the road surface. In this example, the shape of the side of the bumper 4 constitutes part of the rectifiers 50 as a tapered down shape crossing the width direction.

That is to say, as indicated by A portion of FIG. 2A, when viewed from the front, the width of the shape of a normal bumper is approximately the same as or slightly larger than the width between the side faces of the wheel 2 of the wheel house 3. Only a portion of the wheel 2 under the vehicle body can be seen from the front, and running wind from the front does not directly strike an upper portion of the wheel 2. On the other hand, in this example, as indicated by B portion of FIG. 2B, part of the side of the wheel 2 is exposed when viewed from the front because of the tapered down shape of the lower part of the bumper 4. Thus, running wind from the front directly strikes part of the outer circumferential surface 2a of the wheel 2.

The rectifier 50 described above can increase the pressure in the wheel house 3 when the vehicle is running so as to reduce the running wind which flows into the wheel house 3 from the space between the lower end of the bumper 4 of the front of the vehicle and the road surface G. Consequently, the air flow in the wheel house 3 is rectified when the vehicle is running, and turbulence of the flow of the air which flows out from the wheel house 3 can be reduced. Thus, the aerodynamic characteristics of the vehicle can be improved.

Figure 3:
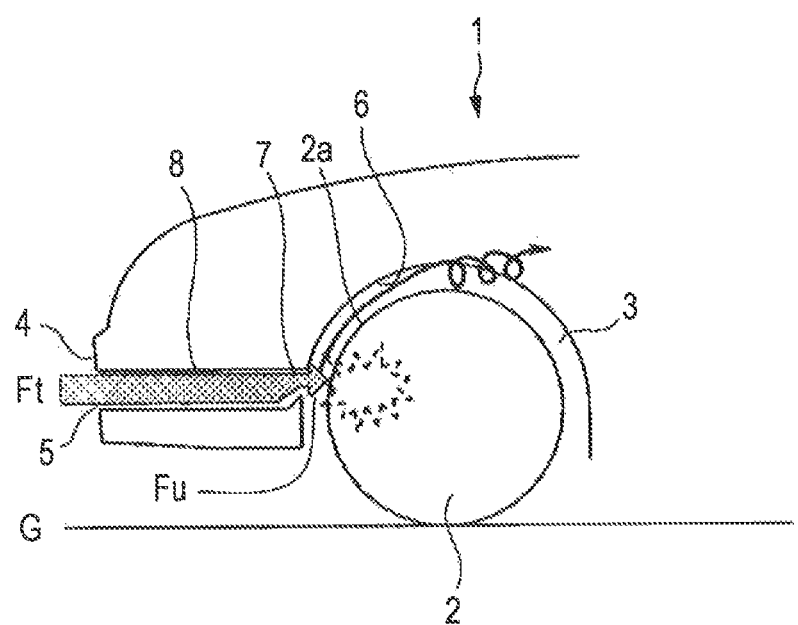
FIG. 3 is an explanatory view illustrating an air flow in the wheel house.

Hereinafter, the rectification of the flow of the air in the wheel house 3 by the rectifier 50 will be described. As illustrated in FIG. 3, when the vehicle 1 is running, running wind is introduced through the air introduction port 5 of the front of the vehicle. An air flow Ft introduced through the air introduction port 5 flows through the air passage 8 and blows through the air blowing port 7 which is formed at the mud guard 6 of the wheel house 3, then strikes the outer circumferential surface 2a of the wheel 2. In addition to the blowing air through the air blowing port 7, the running wind from the lower lateral side of the bumper 4 directly strikes the lateral side of the outer circumferential surface 2a of the wheel 2.

In this manner, the air flow Ft strikes the outer circumferential surface 2a of the wheel 2, and thus the pressure in the wheel house 3 is increased. At this point, the air flow issuing through the air blowing port 7 increases in speed and strikes the outer circumferential surface 2a of the wheel 2 because the air blowing port 7 is formed as a reduced aperture, and thus the pressure in the wheel house 3 can be increased more effectively.

When the pressure in the wheel house 3 is increased, the air flow Fu is reduced and the flow of the air in the wheel house 3 can be rectified, the air flow Fu flowing into the wheel house 3 from a lower position of the vehicle body through the space between the lower end of the bumper 4 and the road surface G. The dominant air flow which flows into the wheel house 3 from a lower position of the vehicle body is a fundamental factor of turbulence, and turbulence is generated in the air flow which issues from the wheel house 3 to the outside. Consequently, by reducing the amount of an air inflow which is a factor of turbulence, the turbulent air flow can be prevented from issuing from the upper arch portion of the wheel house 3 to the outside, and thus the air resistance of the entire vehicle can be reduced.

Figure 4A:
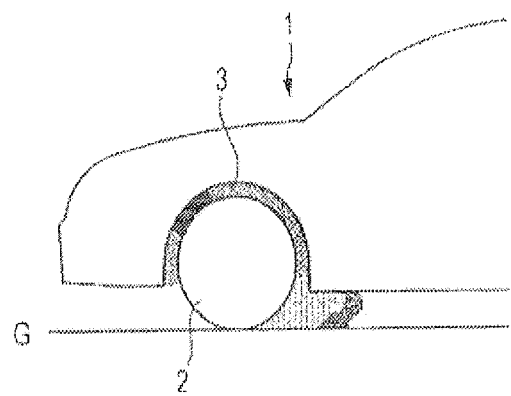
FIGS. 4A to 4C are each an explanatory view illustrating a pressure distribution in the wheel house.
Figure 4B:
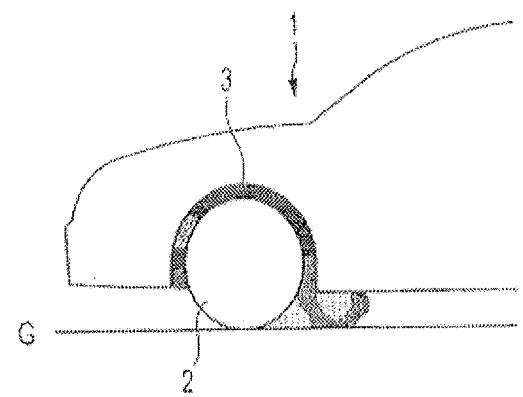
Figure 4C:
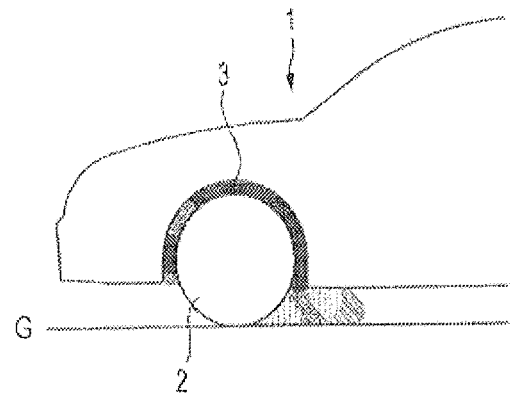
Figure 5A:
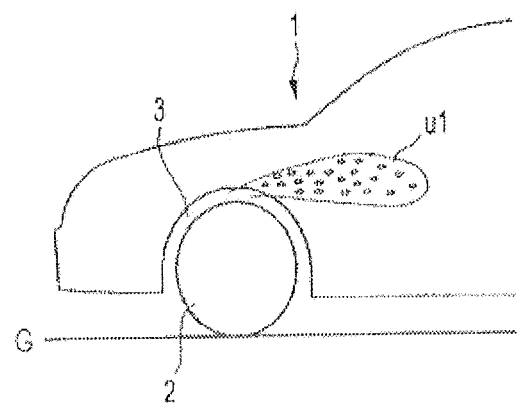
FIGS. 5A to 5C are each an explanatory view illustrating vortices issuing from the wheel house.
Figure 5B:
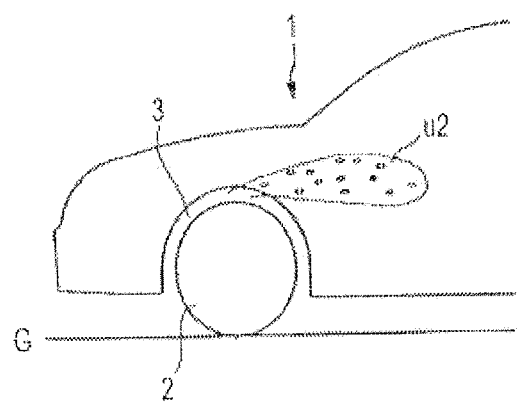
Figure 5C:
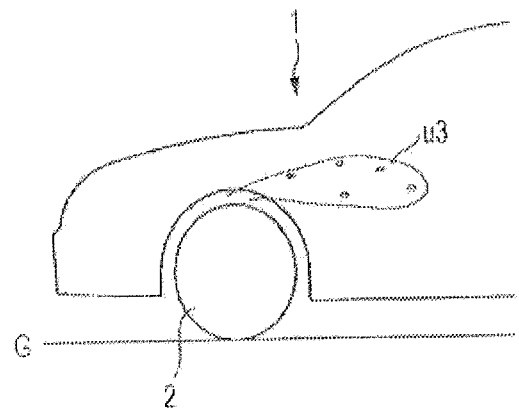
Figure 6:
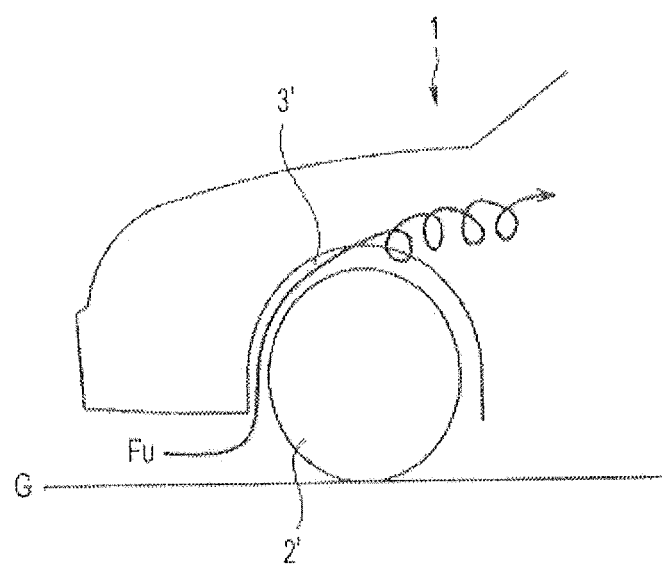
FIG. 6 is an explanatory view illustrating an air flow in the wheel house of a conventional vehicle.

Such a rectifying effect by the rectifier 50 is verified by simulation analysis using a computer. For example, the result as illustrated in FIGS. 4A to 4C, FIGS. 5A to 5C is obtained. FIGS. 4A to 4C each illustrate a pressure distribution in the wheel house 3 when the air flow strikes the outer circumferential surface 2a of the wheel 2. FIGS. 5A to 5C each illustrates vortices issuing from the wheel house 3 correspondingly to the pressure distribution in the wheel house 3.

Specifically, FIG. 4A illustrates a conventional pressure distribution without using the rectifier 50. FIG. 4B illustrates a pressure distribution achieved by only the running wind from the lower lateral side of the bumper 4. FIG. 4C illustrates a pressure distribution achieved by the blowing air through the air blowing port 7 and the running wind from the lower lateral side of the bumper 4. In FIGS. 4A to 4C, darker colored area indicates an area with a higher pressure. It can be seen from FIGS. 4A to 4C that an area with a higher pressure increases in the order of FIG. 4A, FIG. 4B, and FIG. 4C.

FIG. 5A illustrates vortices u1 which are generated in the flow which issues from the wheel house 3 correspondingly to the pressure distribution of FIG. 4A, FIG. 5B illustrates vortices u2 which are generated in the flow which issues from the wheel house 3 correspondingly to the pressure distribution of FIG. 4B. FIG. 5C illustrates vortices u3 which are generated in the flow which issues from the wheel house 3 correspondingly to the pressure distribution of FIG. 4C. It can be seen from FIGS. 5A to 5C that the vorticity decreases in the order of FIG. 5A, FIG. 5B, and FIG. 5C.

Based on the analysis result illustrated in FIGS. 4 and 5, it can be seen that the pressure in the wheel house 3 can be increased by allowing the air flow to strike the outer circumferential surface 2a of the wheel 2 in the wheel house 3, and the flow of running wind from a lower position of the wheel house 3 can be reduced by the increased pressure in the wheel house 3, the flow being a fundamental factor of turbulences. Consequently, the number of vortices in the air flow issuing to the outside from the wheel house 3 can be reduced.

Thus, in this example, the turbulence-causing flow of running wind into the wheel house is reduced, turbulence of the air flow which issues from the wheel house is reduced, and thus the air resistance is decreased. Consequently, overall vehicle aerodynamic characteristics can be improved.

The invention claimed is:

1. A rectifier of a vehicle wheel house for rectifying an air flow in the wheel house housing a wheel, the rectifier comprising:
    an air passage to introduce running wind from a forward position of a vehicle; and
    an air blowing port formed at a partition wall member included in a partition wall of the wheel house on a vehicle body side, the air blowing port being configured to allow the running wind through the air passage to strike an outer circumferential surface of the wheel,
    wherein the air blowing port is formed to have an opening area smaller than a passage cross-sectional area of the air passage.

2. The rectifier of a vehicle wheel house according to claim 1, wherein
    the air passage is formed as a duct-like passage, through which an air introduction port which is formed at a front part of the vehicle and the air blowing port of the wheel house are communicated with each other, and
    the air blowing port is positioned to direct an air flow from the air passage to strike an outer circumferential surface of the wheel at a location in the front-half of the wheel, in the vehicle front-rear direction.

3. The rectifier of a vehicle wheel house according to claim 1, wherein a lower end of an exterior member of a front part of the vehicle is located inwardly of a side surface of the wheel housed in the wheel house in a width direction of the vehicle.

4. The rectifier of a vehicle wheel house according to claim 2, wherein a lower end of an exterior member of a front part of the vehicle is located inwardly of a side surface of the wheel housed in the wheel house in a width direction of the vehicle.

5. A rectifier of a vehicle wheel house for rectifying an air flow in the wheel house housing a wheel, the rectifier comprising:
    an air passage to introduce running wind from a forward position of a vehicle; and an air blowing port formed at a partition wall member included in a partition wall of the wheel house on a vehicle body side, the air blowing port being configured to allow the running wind through the air passage to contact a surface of the wheel, wherein the air passage communicates an air introduction port formed at a front part of the vehicle with the air blowing port of the wheel house, and wherein the air blowing port has an opening area smaller than a passage cross-sectional area of the air passage.

6. The rectifier of a vehicle wheel house according to claim 5, wherein a lower end of an exterior member of a front part of the vehicle is located inwardly of a side surface of the wheel housed in the wheel house in a width direction of the vehicle.

7. The rectifier of a vehicle wheel house according to claim 5, wherein an opening of the air blowing port opens toward a position above the center of the front side of the wheel.

8. The rectifier of a vehicle wheel house according to claim 5, wherein the air blowing port is positioned to direct an air flow from the air passage to make first contact with the wheel at an outer circumferential surface of the wheel.

9. The rectifier of a vehicle wheel house according to claim 8, wherein the location at which an air flow directed from the air passage makes first contact with the wheel at an outer circumferential surface of the wheel is a location in the front-half of the wheel, in the vehicle front-rear direction.

10. A rectifier of a vehicle wheel house for rectifying an air flow in the wheel house housing a wheel, the rectifier comprising:

an air passage to introduce running wind from a forward position of a vehicle; and an air blowing port formed at a partition wall member included in a partition wall of the wheel house on a vehicle body side, the air blowing port being configured to allow the running wind through the air passage to strike an outer circumferential surface of the wheel, wherein the air blowing port is positioned to direct an air flow from the air passage to strike an outer circumferential surface of the wheel at a location in the front-half of the wheel, in the vehicle front-rear direction, and an opening of the air blowing port opens toward a position above the center of the front side of the wheel.

11. The rectifier of a vehicle wheel house according to claim 10, wherein a lower end of an exterior member of a front part of the vehicle is located inwardly of a side surface of the wheel housed in the wheel house in a width direction of the vehicle.

* * * * *